March 20, 1962 H. G. BRILMYER ETAL 3,025,730
DRIVING TOOL FOR APPLYING TORQUE DRIVEN LOCKBOLT FASTENERS
Original Filed July 31, 1958 2 Sheets-Sheet 2

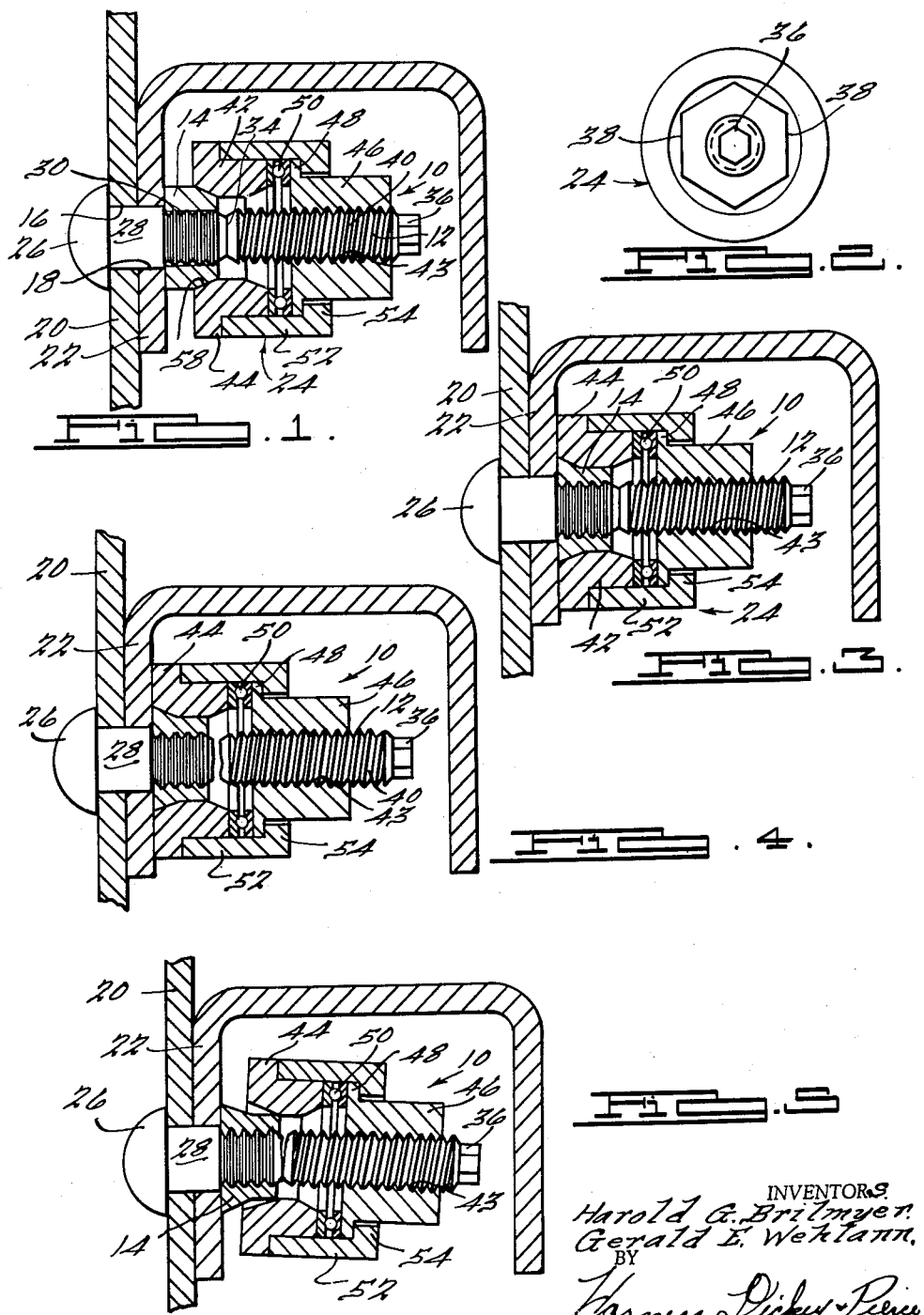

INVENTORS.
Harold G. Brilmyer.
Gerald E. Wehlann.
BY
Harness, Dickey & Pierce.
ATTORNEYS.

3,025,730
DRIVING TOOL FOR APPLYING TORQUE DRIVEN LOCKBOLT FASTENERS
Harold G. Brilmyer, Grosse Pointe, and Gerald Edward Wehlann, Detroit, Mich., assignors to Huck Manufacturing Company, Detroit, Mich., a corporation of Michigan
Original application July 31, 1958, Ser. No. 752,303. Divided and this application Oct. 19, 1959, Ser. No. 847,134
1 Claim. (Cl. 78—46)

This invention relates generally to fasteners and more particularly to a driving tool for applying torque driven lockbolt fasteners. This application is a division of our prior application Serial No. 752,303, filed July 31, 1958.

A lockbolt fastener of the general type to which this invention relates is shown in Patent No. 2,531,048 as consisting of a pin having a preformed head adapted to be inserted from one side of the work and a tubular collar adapted to be inserted over the pin at the opposite side of the work for subsequent swaging or clinching to the pin. Prior fasteners of this type have been set by means of automatic or manually operated tools which pull the pin and apply the reaction force to the collar in substantially the same manner as disclosed in the above patent. The pin is formed with a plurality of pull grooves to adapt it for gripping and pulling by jaws having teeth shaped to fit in the pull grooves and the tools provided with such jaws are applied to the fastener by inserting them over the end of the pin. Consequently, the fasteners have heretofore been usable only in locations in which clearance between the end of the pin and any adjacent structure is sufficient to accommodate the tool. The fastener disclosed in our prior application referred to above can be driven under minimum clearance conditions because it is threaded for supporting a driving tool.

The object of this invention is to provide a small driving tool for fasteners of the type disclosed in our prior application which is operated with an ordinary wrench.

A further object of this invention is to provide a fastener applying tool which is simple and includes a swaging anvil and a nut rotatably mounted on one end of the anvil.

Further objects, features and advantages of this invention will become apparent from a consideration of the following description, the appended claim and the accompanying drawing in which:

FIGURE 1 is a cross-sectional view of a fastener shown in an initially assembled position relative to a pair of members to be connected and illustrating the driving tool of this invention mounted on the fastener for applying it to the members;

FIGURE 2 is an end view of the fastener and driving tool shown in FIG. 1;

FIGURES 3 and 4 are sectional views of a fastener and the driving tool of this invention, illustrated similarly to FIGURE 1, showing the fastener in successive stages of being driven;

Figure 6:
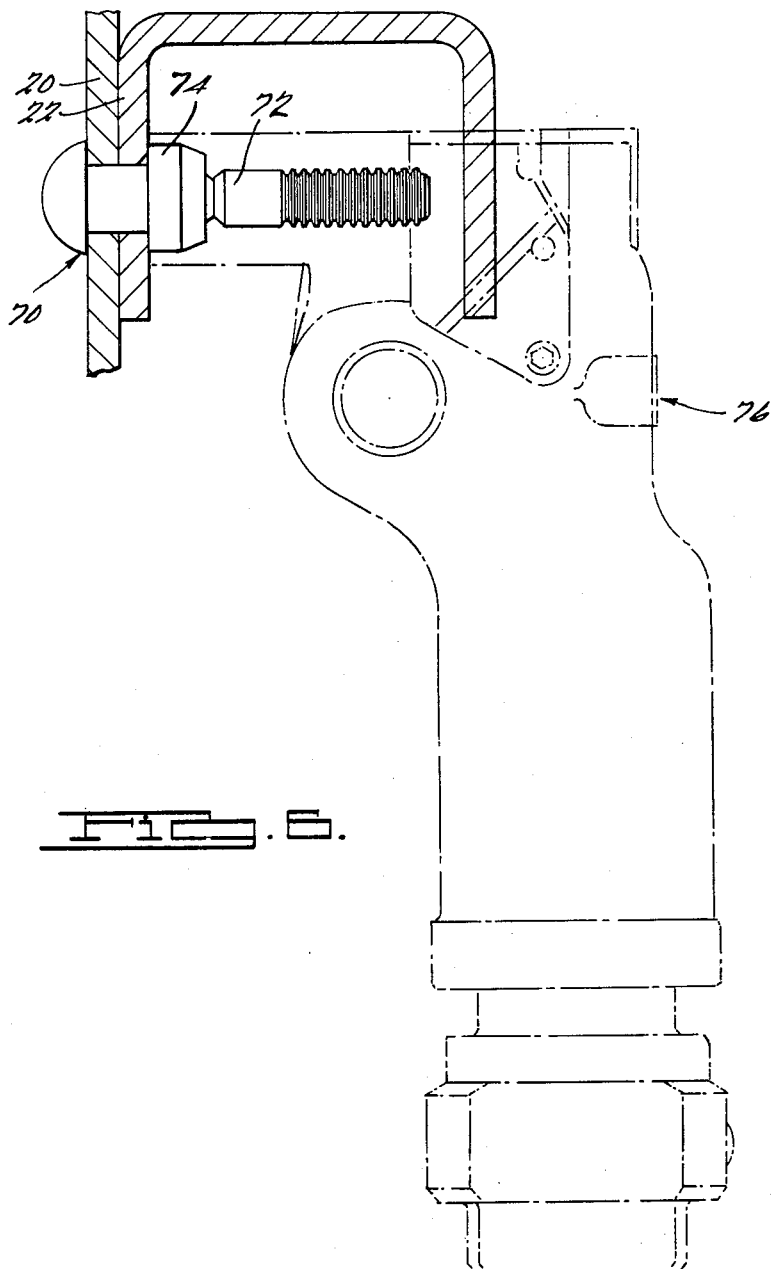

FIGURE 5 is a sectional view of a fastener and the driving tool of this invention showing the use of the fasteenr pintail as a jack to remove the tool from the driven fastener; and FIGURE 6 is a cross-sectional view of the members to be connected shown in FIGURE 1, illustrating a fastener of the type which must be driven by a pull gun in assembly relation with the members, and showing one of the smallest hydraulic pull gun assemblies in broken lines in a position it would have to occupy to drive the fastener.

With reference to the drawing, a fastener 10 of a type to be applied with the tool of this invention, is illustrated in FIGURE 1 as including a pin 12 provided with a collar 14. The pin 12 is shown in FIGURE 1 extending through a pair of openings 16 and 18 formed in a plate 20 and one leg of a channel member 22, respectively, which are to be connected with the fastener 10. The driving tool 24 of this invention is shown mounted on the pin 12 in a position engaged with one end of the collar 14 for swaging the collar onto the pin 12.

The pin is provided with an integral preformed head 26 adapted to engage the outer side of the panel 20, with the pin 12 extending through and beyond the openings 16 and 18. The pin 12 has a cylindrical hole-filling portion 28 adjacent the head 26 and is formed with a plurality of locking grooves 30 adjacent the portion 28. Between each pair of adjacent grooves 30 a narrow annular rib or land 32 is formed.

The pin 12 is provided with a reduced diameter breakneck portion 34 adjacent the locking grooves 30. This breakneck 34 is the weakest part of the pin 12 so that when the pin is subjected to a tension load sufficient to fracture it, breaking of the pin at the breakneck 34 is insured. At the end of the pin opposite the head 26, the pin is formed with a hex-shaped wrenching portion 36 which has six flat faces 38 arranged in parallel pairs. Between the breakneck 34 and the wrenching portion 36, the pin 12 is formed with an externally threaded stem portion 40.

The collar 14, which is received over the end of the pin 12, is located against the adjacent face of the channel 22 as illustrated in FIGURE 1 and is adapted to be swaged or contracted radially inwardly into the locking grooves 30 so as to lock the collar 14 to the pin 12 and form what constitutes a fastener head positioned against the channel 22 in the set position of the fastener 10. A collar similar to the collar 14 is described in detail in Huck Patent No. 2,531,048 and is illustrated in FIGURE 1 in its initial form, namely, the form of the collar before it is swaged or locked to the pin 12.

The driving tool 24 of this invention consists of a tubular swaging anvil 42 having an outwardly extending flange 44 at its forward end, a nut member 46 of hex-shape having an internal screw thread 43 axially aligned with the anvil 42 and having an outwardly extending flange 48 at its forward end, and a thrust bearing 50 disposed between and in axial alignment with the flange 48 and the rear end of the anvil 42. A retainer sleeve 52 which is pressed onto the anvil 42 to a position against the flange 44 has an inwardly extending flange 54 which is engageable with the nut member flange 48 to maintain the anvil 42, nut member 46 and bearing 50 in assembly relation.

In the use of the fastener 10 to connect the members 20 and 22 shown in FIGURE 1, the pin is extended through the openings 16 and 18 as shown in FIGURE 1 and the collar 14 is inserted over the pin to a position against the outer side of the channel 22. The tool 24 is then applied to the pin 12 by threading the nut member 46 onto the pin stem portion 40 so that the anvil 42 is moved into a position in which the tapered inner face 58 thereof engages the adjacent end of the collar 14 as shown in FIGURE 1. A wrench is then applied to the nut member 46 which is then rotated to advance it on the threaded stem portion 40 with a resulting pull on the pin 12 in a direction such that the pin head 26 forces the adjacent plate 20 tightly against the channel 22. During such rotation of the nut member 46 with one wrench, a second wrench may be applied to the wrenching portion 36 of the pin 12 to hold the pin against rotation, although this is not always necessary.

Continued rotation of the nut member 46 with a wrench moves the anvil 42 longitudinally of the collar 14 so as to swage the collar into the grooves 30 and into locking engagement with the ribs 32 on the pin 12 as shown in FIGURE 3. Further rotation of the nut member 46, after swaging of the collar 14 has been completed, increases the tensile force on the pin 12 which eventually fractures the pin at the breakneck 34 as shown in FIGURE 4. The application of the fastener 10 to the members 20 and 22 has then been completed so that the fastener 10 (FIG. 4) cannot be distinguished from a similar fastener driven with conventional power or hand-operated pull tools.

In order to remove the anvil 42 from the driven fastener 10, it is necessary to manipulate a wrench applied to the wrenching portion 36 of the pin 12 so as to rotate the pintail, namely, the stem portion 40 and the wrenching portion 36 which have been separated from the driven fastener, in a direction to move it into engagement with the pin 12 at the fractured breakneck 34. On rotation, the pintail acts as a jack to pull the anvil 42 off the swaged collar 14 as illustrated in FIGURE 5. After the anvil 42 has been completely removed from the collar 14, the pintail is removed from the tool 24 by threading it out of the nut member 46.

It can thus be seen that the fastener 10 can be readily driven, by manipulation of the tool 24, in the narrow space between the legs of the channel 22, to connect the members 20 and 22. In FIGURE 6 a fastener 70 of the type which is driven by pulling on the pin 72 and applying the reaction force to the collar 74 is illustrated extending through the plate 20 and one leg of the channel 22. A scale outline of one of the smallest commercially available hydraulic pull guns 76 is illustrated in broken lines in the position it would have to occupy to drive the fastener 70. Since the gun 76 obviously cannot be placed in this position because only the narrow space between the channel legs is available, it is apparent that the gun 76 cannot be used to apply a fastener to connect the members 20 and 22 so that the fastener head is adjacent the plate 20.

The connection of the members 20 and 22 with the fastener 10 is only one illustration of situations in which the conventional fastener 70 and pull gun 76 cannot be used, while the fastener 10 and tool 24 of this invention are readily manipulated in such a situation to provide the desired connection.

From the above description, it is seen that this invention provides a tool 24 which is capable of applying a fastener 10 under minimum clearance conditions. Since to drive the fastener 10 it is only necessary to apply wrenches to the nut member 46 and the wrenching portion 36, the fastener 10 can be set by approaching it from any one of its sides. As a result, the tool 24 can be used in locations in which conventional driving tools could not be used.

It will be understood that the specific construction of the improved driving tool herein disclosed and described is presented for purposes of explanation and illustration only and is not intended to indicate limits of the invention, the scope of which is defined by the following claim.

What is claimed is:

The combination including a fastener comprising an integral one piece pin including a head at one end, an externally and circumferentially grooved portion spaced from said head, having circumferential locking grooves formed therein, a stem portion at the end of said pin opposite said head, and an annular section weaker than the remaining portion of said pin providing a breakneck between said grooved portion and said stem portion, said fastener further including a collar positioned on said pin and adapted to be swaged into said locking grooves when said fastener is set, said stem portion having screw threads formed on the surface thereof and terminating in a section shaped to be gripped with a wrench; and a driving tool comprising a swaging anvil having a tubular end portion formed with a tapered inner surface and being adapted to be placed over said stem portion and into engagement with said collar to set the same, a nut member having an internal screw thread and being threadably engageable with said stem portion, a bearing aligned with and positioned between said nut member and said anvil, and means holding said nut member, said anvil and said bearing in aligned relation, said nut member having an external surface adapted to be gripped by a wrench such that rotation of said nut member on said stem portion in one direction causes an axial force to be applied relative to said pin and said collar to set the collar.

References Cited in the file of this patent

UNITED STATES PATENTS

| | | |
|---|---|---|
| 2,531,049 | Huck | Nov. 21, 1950 |
| 2,542,376 | Torresen | Feb. 20, 1951 |
| 2,804,798 | Brilmyer | Sept. 3, 1957 |
| 2,923,182 | Strother | Feb. 2, 1960 |

FOREIGN PATENTS

| | | |
|---|---|---|
| 1,094,042 | France | May 11, 1955 |

OTHER REFERENCES

B. F. Goodrich Rivnuts (Data Book for Designers and Engineers), revised August 1952, page 12.